United States Patent
Olson

(10) Patent No.: US 8,000,941 B2
(45) Date of Patent: Aug. 16, 2011

(54) SYSTEM AND METHOD FOR SURFACE RECONSTRUCTION FROM AN UNSTRUCTURED POINT SET

(75) Inventor: Eric Steven Olson, Maplewood, MN (US)

(73) Assignee: St. Jude Medical, Atrial Fibrillation Division, Inc., St. Paul, MN (US)

( * ) Notice: Subject to any disclaimer, the term of this patent is extended or adjusted under 35 U.S.C. 154(b) by 799 days.

(21) Appl. No.: 11/967,214

(22) Filed: Dec. 30, 2007

(65) Prior Publication Data

US 2009/0171627 A1    Jul. 2, 2009

(51) Int. Cl.
*G06F 17/50*    (2006.01)
(52) U.S. Cl. ............................................. 703/1
(58) Field of Classification Search ...................... 703/1
See application file for complete search history.

(56) References Cited

U.S. PATENT DOCUMENTS

| | | | |
|---|---|---|---|
| 5,662,108 A | 9/1997 | Budd et al. | |
| 5,697,377 A | 12/1997 | Wittkampf | |
| 5,983,126 A | 11/1999 | Wittkampf | |
| 6,075,871 A | 6/2000 | Simanovsky | |
| 6,728,562 B1 | 4/2004 | Budd et al. | |
| 2004/0252870 A1 | 12/2004 | Reeves et al. | |
| 2004/0254437 A1 | 12/2004 | Hauck et al. | |
| 2005/0203394 A1 | 9/2005 | Hauck | |
| 2006/0052943 A1* | 3/2006 | Ramani et al. | 702/19 |
| 2007/0057945 A1 | 3/2007 | Olson et al. | |
| 2007/0165921 A1 | 7/2007 | Agam et al. | |
| 2008/0074419 A1* | 3/2008 | Museth et al. | 345/420 |

OTHER PUBLICATIONS

International Search Report and Written Opinion for PCT/US08/87127 filed Dec. 17, 2008, dated Feb. 6, 2009.
Barber, C.B., et. al., The Quickhull algorithm for convex hulls, ACM Trans. On Mathematical Software, 22(4):469-483 Dec. 1996.

* cited by examiner

*Primary Examiner* — Paul L Rodriguez
*Assistant Examiner* — Andre Pierre Louis
(74) *Attorney, Agent, or Firm* — Wiley Rein LLP

(57) ABSTRACT

A method of modeling a surface from a plurality of geometry points representing an object generally includes binning the plurality of geometry points into an n-dimensional array of cells and associating a binary value with each cell; applying a dilation algorithm to the binned plurality of geometry points to output a dilated binary representation of the plurality of geometry points; applying an erosion algorithm to the dilated binary representation of the plurality of geometry points to output a segmented volume; and applying a surface construction algorithm to the segmented volume to form a surface model of the object.

37 Claims, 9 Drawing Sheets

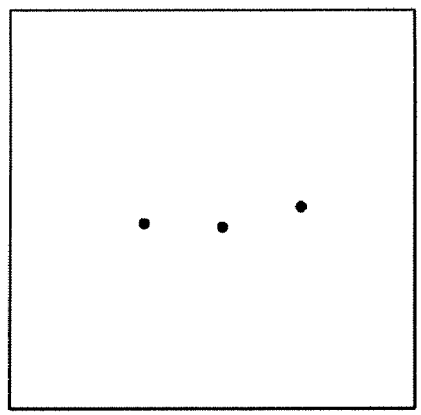
FIG.2a
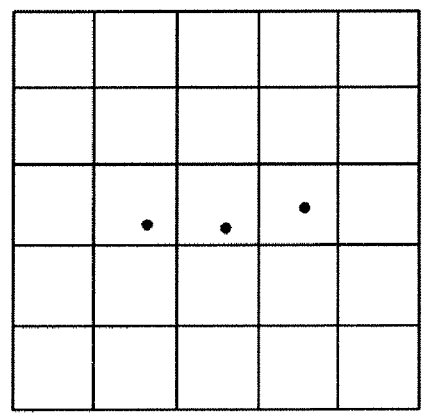
FIG.2b
| 0 | 0 | 0 | 0 | 0 |
|---|---|---|---|---|
| 0 | 0 | 0 | 0 | 0 |
| 0 | 1 | 1 | 1 | 0 |
| 0 | 0 | 0 | 0 | 0 |
| 0 | 0 | 0 | 0 | 0 |
FIG.2c

SYSTEM AND METHOD FOR SURFACE RECONSTRUCTION FROM AN UNSTRUCTURED POINT SET

BACKGROUND OF THE INVENTION a. Field of the Invention

The instant invention relates to surface modeling. In particular, the instant invention relates to a system and method for reconstruction of a surface from an unstructured cloud of data points.

b. Background Art

It is well known to generate heart chamber geometry in preparation for cardiac diagnostic or therapeutic procedures. Often, a mapping catheter is introduced into the heart chamber of interest and moved around within the heart chamber, either randomly, pseudo-randomly, or according to one or more preset patterns. The three-dimensional coordinates of the mapping catheter are measured using a localization system (sometimes also referred to as a "mapping system," "navigation system," or "positional feedback system"). The three-dimensional coordinates become a geometry point (or "location data point"). Multiple measurements may be taken as the catheter is moved within the heart chamber, resulting in a cloud of geometry points that defines the geometry of the heart chamber. Various surface construction algorithms may then be applied to wrap a surface around the cloud of geometry points to obtain a surface representation of the heart chamber geometry.

One such surface construction algorithm generates a convex hull about the cloud of geometry points. The convex hull may be generated using standard algorithms such as the Qhull algorithm. The Qhull algorithm is described in Barber, C. B., Dobkin, D. P., and Huhdanpaa, H. T., "The Quickhull algorithm for convex hulls," *ACM Trans. on Mathematical Software,* 22(4):469-483, December 1996. Other algorithms used to compute a convex hull shape are known and may also be suitable for use in implementing the invention.

Another surface construction algorithm is Alpha Shapes. The alpha shape is a generalization of the convex hull and a subgraph of the Delaunay triangulation. For a sufficiently large alpha, the alpha shape is identical to the convex hull, while for a sufficiently small alpha, the alpha shape is empty.

Another exemplary method for creating a shell corresponding to the shape of the heart chamber fits a radial array of bins around groups of geometry points. The bins are typically constructed by determining a mean center point of the cloud of geometry points and extending borders radially outward from the mean center point to the furthest geometry point within the slice encompassed by the bin. The radial end faces of the bins thus approximate the surface of the heart chamber wall. Common graphic shading algorithms can then be employed to "smooth" the surface of the shell thus created out of the radial end faces of the bins.

Existing surface reconstruction algorithms have certain shortcomings, however. For example, by definition, convex hull algorithms cannot be used to estimate non-convex boundaries, while algorithms using alpha shapes are computationally intensive.

BRIEF SUMMARY OF THE INVENTION

It is desirable to be able to more efficiently construct a surface from a cloud of geometry points.

It is also desirable to be able to construct complex, non-convex surfaces from a cloud of geometry points.

Disclosed herein is a method of modeling a surface from a plurality of geometry points representing a three-dimensional object. The method generally includes the steps of: creating a binary representation of the plurality of geometry points by binning the plurality of geometry points into a three-dimensional array of voxels and associating a first binary value with each voxel in which a geometry point is binned; transforming voids within the binary representation of the plurality of geometry points using an image close algorithm to create a segmented volume comprising the plurality of geometry points and the transformed voids; and applying a surface construction algorithm to the segmented volume to form a surface model of the three-dimensional object. The surface construction algorithm may be a marching cubes algorithm or another suitable surface construction algorithm.

The plurality of geometry points may be generated utilizing a localization system. For example, the three-dimensional object may be a portion of a heart, and the step of generating the plurality of geometry points utilizing a localization system may include: inserting a mapping catheter into the portion of the heart; moving the mapping catheter within the portion of the heart; and periodically utilizing the localization system to measure a location of the mapping catheter within the portion of the heart.

In some embodiments of the invention, the image close algorithm includes the following steps: defining a dilation structuring element having a shape and a volume; dilating the binary representation of the plurality of geometry points with the dilation structuring element to create a dilated binary representation having a surface perimeter; defining an erosion structuring element having a shape and a volume; and eroding the surface perimeter of the dilated binary representation with the erosion structuring element to create the segmented volume. Preferably, the shape and the volume of the dilation structuring element are identical to the shape and the volume of the erosion structuring element. It is also preferable for the shape of the dilation element and the shape of the erosion element to be spherical, and in particular a sphere of radius sufficient to capture exactly the next layer of voxels. Optionally, the image close algorithm further includes a flood-fill operation on the dilated binary representation of the plurality of geometry points prior to the eroding step.

The method may also include iteratively repeating the dilating step until an R-value of the dilated binary representation of the plurality of geometry points equals 1 and a genus of the dilated binary representation of the plurality of geometry points equals 0. The dilating step may be iteratively repeated utilizing dilation structuring elements having increasingly larger volumes.

In some embodiments of the invention, the dilating step includes: a) calculating a genus of the binary representation of the plurality of geometry points; b) dilating the binary representation of the plurality of geometry points with the dilation structuring element to identify a plurality of dilated voxels; c) selecting one of the plurality of dilated voxels; d) generating a modified binary representation comprising the plurality of geometry points and the selected dilated voxel; e) calculating a genus of the modified binary representation; and f) assessing whether the genus of the modified binary representation is greater than the genus of the binary representation of the plurality of geometry points, and, if the genus of the modified binary representation is greater than the genus of the binary representation of the plurality of geometry points, redefining the plurality of geometry points and the binary representation of the plurality of geometry points to include the selected dilated voxel. The redefined plurality of geometry points may then be dilated with the dilation structuring element. Alternatively, the redefined plurality of geometry points may be dilated with a redefined dilation structuring element having the shape of the dilation structuring element and a volume that is greater than or less than (e.g., that differs from) the volume of the dilation structuring element. Of course, steps a) through f) may be repeated for each voxel within the plurality of dilated voxels.

In some embodiments of the invention, the eroding step includes: a) calculating a genus of the dilated binary representation; b) eroding the surface perimeter of the dilated binary representation with the erosion structuring element to identify a plurality of eroded voxels; c) selecting one of the plurality of eroded voxels; d) generating a modified dilated binary representation excluding the selected eroded voxel; e) calculating a genus of the modified dilated binary representation; and f) assessing whether the genus of the modified dilated binary representation differs from the genus of the dilated binary representation, and, if the genus of the modified dilated binary representation does not differ from the genus of the dilated binary representation, redefining the dilated binary representation to exclude the selected eroded voxel.

Preferably, the dilating step is not permitted to modify the binary representation by dilating one or more voxels where the dilation of the one or more voxels would decrease a genus of the dilated binary representation. It is also desirable to provide that the eroding step is not permitted to modify the dilated binary representation by eroding one or more voxels where the erosion of the one or more voxels would increase an R-value of the segmented volume. Further, in some embodiments of the invention, it is contemplated that the eroding step is not permitted to modify the dilated binary representation by eroding one or more voxels where the erosion of the one or more voxels would change a genus of the segmented volume.

To reduce the likelihood of merging structures in close proximity to one another, the method according to the present invention may also include associating a dilation level with a dilated voxel, the dilation level being related to a dilation iteration during which the dilated voxel was dilated without decreasing a genus of the binary representation of the plurality of geometry points. Thereafter, the dilated voxel may be eroded at an erosion level no greater than the dilation level associated with the dilated voxel.

It may also be desirable to define a plurality of surface geometry points within the plurality of geometry points and iteratively repeat the eroding step until a boundary of the segmented volume coincides with the plurality of defined surface geometry points.

The present invention also provides a method of modeling a surface from a plurality of geometry points that includes the following steps: binning the plurality of geometry points into a n-dimensional array of elements; dilating the binned plurality of geometry points utilizing a dilation algorithm to eliminate at least one void within the binned plurality of geometry points; eroding an output of the dilation algorithm utilizing an erosion algorithm to output a voidless segmented volume defined by the plurality of geometry points; and applying a surface construction algorithm to the voidless segmented volume to output an n-dimensional surface model representing a boundary defined by the plurality of geometry points. 26. N may equal 3. N may also equal 4 (e.g., a time-dependent series of surface models).

The dilation algorithm may include: defining a dilation structuring element occupying an n-dimensional space; calculating a genus of the binned plurality of geometry points; applying the dilation structuring element to a geometry point within the binned plurality of geometry points; modifying the binned plurality of geometry points to include an element within the n-dimensional space occupied by the dilation structuring element; calculating a genus of the modified binned plurality of geometry points; comparing the genus of the binned plurality of geometry points to the genus of the modified binned plurality of geometry points; and redefining the binned plurality of geometry points to include the element within the n-dimensional space occupied by the dilation structuring element if the genus of the modified binned plurality of geometry points is greater than the genus of the binned plurality of geometry points. Preferably, the output of the dilation algorithm has an R-value of 1 and a genus of 0.

The erosion algorithm may include: defining an erosion structuring element occupying an n-dimensional space; calculating a genus of the dilated binned plurality of geometry points; applying the erosion structuring element to an element on a perimeter of the dilated binned plurality of geometry points; modifying the dilated binned plurality of geometry points to exclude an element within the n-dimensional space occupied by the erosion structuring element; calculating a genus of the modified dilated binned plurality of geometry points; comparing the genus of the dilated binned plurality of geometry points to the genus of the modified dilated binned plurality of geometry points; and redefining the dilated binned plurality of geometry points to exclude the element within the n-dimensional space occupied by the erosion structuring element if the genus of the modified dilated binned plurality of geometry points is not less than the genus of the dilated binned plurality of geometry points.

In still another aspect of the present invention, a method of constructing a surface from a cloud of geometry points, includes: eliminating voids within the cloud of geometry points, thereby creating a voidless segmented volume defined by the cloud of geometry points; and constructing a surface bounding the voidless segmented volume defined by the cloud of geometry points. Typically, the step of eliminating voids within the cloud of geometry points includes: dilating the cloud of geometry points to eliminate voids therein; and eroding a perimeter of the dilated cloud of geometry points to create the segmented voidless volume defined by the cloud of geometry points. The step of dilating the cloud of geometry points may include dilating the cloud of geometry points to a first preset threshold, and the step of eroding a perimeter of the dilated cloud of geometry points may include eroding the perimeter of the dilated cloud of geometry points to a second present threshold.

Also disclosed herein is a system for generating an n-dimensional surface model from a plurality of geometry points. The system generally includes: a localization system to generate the plurality of geometry points; a processor programmed to bin the plurality of geometry points into an n-dimensional array of elements; an image close processor programmed to dilate and erode the binned plurality of geometry points; and a surface construction processor programmed to generate a surface on an output of said image close processor. Preferably, the output of the image close processor is a single segmented volume free of voids therein. The image close processor may redefine the plurality of geometry points to include at least one element within the n-dimensional array of elements, the dilation of which increases a genus of the plurality of geometry points. It may also redefine the plurality of geometry points to include at least one element within the n-dimensional array of elements, the erosion of which decreases a genus of the plurality of geometry points.

In still another aspect of the present invention, a method of modeling a surface from a plurality of geometry points representing an object, includes the following steps: creating a representation of the plurality of geometry points by binning the plurality of geometry points into an n-dimensional array of cells and associating a confidence value with each cell, wherein the confidence value for a cell expresses a probability that a geometry point is binned within the cell; applying a dilation algorithm to the binned plurality of geometry points to output a dilated binary representation of the plurality of geometry points; applying an erosion algorithm to the dilated binary representation of the plurality of geometry points to output a segmented volume; and applying a surface construction algorithm to the segmented volume to form a surface model of the object. The step of applying a surface construction algorithm to the segmented volume may include: selecting a confidence level threshold; and applying the surface construction algorithm to cells having an associated confidence value greater than or equal to the selected confidence level threshold.

An advantage of the present invention is that it reduces the time and overhead required to reconstruct a surface from a cloud of geometry points.

Another advantage of the present invention is that it permits the modeling of complex, non-convex surfaces.

The foregoing and other aspects, features, details, utilities, and advantages of the present invention will be apparent from reading the following description and claims, and from reviewing the accompanying drawings.

BRIEF DESCRIPTION OF THE DRAWINGS

FIG. 2a illustrates, in two dimensions, a representative cloud of geometry points.

FIG. 2b illustrates the cloud of geometry points of FIG. 2a binned into a two-dimensional array of elements, such as pixels.

FIG. 2c illustrates a binary representation of the binned cloud of geometry points of FIG. 2b.

FIG. 3b illustrates the results of a dilation operation on FIG. 3a.

FIG. 5a illustrates a binary representation of a plurality of geometry points including a void.

FIG. 5b illustrates the results of a dilation operation on FIG. 5a that fills the void.

FIG. 5c illustrates a modified binary representation containing the plurality of geometry points of FIG. 5a and a selected dilated voxel.

FIG. 8b illustrates the creation of a void by the dilation of the open loop of FIG. 8a.

DETAILED DESCRIPTION OF THE INVENTION

The present invention provides a method and system for modeling a surface from a plurality of geometry points. Preferably, the present invention is practiced in three dimensions in order to model a surface defined by a cloud of geometry points representing a three dimensional object, but it is contemplated that the invention may be practiced in any number of dimensions, as would be appreciated by one of ordinary skill in the art. For example, by collecting an ECG and/or a respiratory signal, the geometry points may be binned according to time and/or phase so as to generate several surface models. When displayed according to the timing signals, these models represent a time-varying, or four-dimensional, geometry. Further, though many of the examples utilized in describing the invention will relate to modeling a portion of a patient's heart, one of ordinary skill in the art will recognize that the invention is not so limited.

Figure 1:
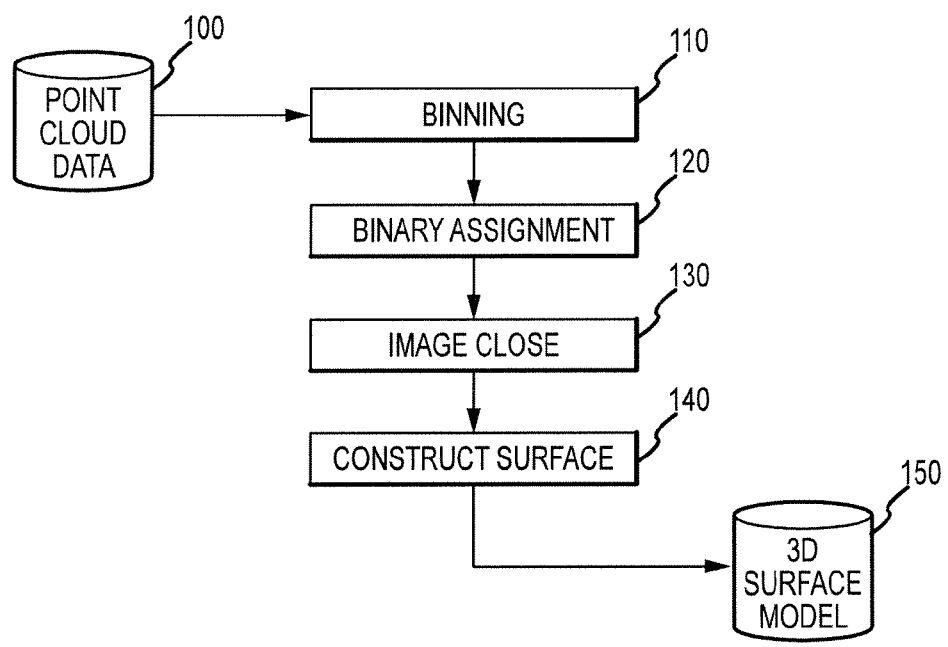
FIG. 1 is a flowchart illustrating steps that may be carried out in modeling a three-dimensional surface according to the present invention.

A top level method of modeling a surface from a plurality of geometry points is shown in the flowchart of FIG. 1. In step 100, a plurality (or cloud) of geometry points is provided. The cloud of geometry points represents a three dimensional object, for example a heart chamber. FIG. 2a illustrates, in two dimensions, a representative cloud of geometry points. The geometry points may be collected using a suitable localization or mapping system, for example the Ensite NavX™ navigation and visualization system of St. Jude Medical, Inc. or the CARTO navigation system from Biosense Webster, Inc. Alternatively, the plurality of geometry points may be retrieved (e.g., accessed and opened) from a storage device, such as a hard disk drive, an optical disk, or other memory device. It is also contemplated that the plurality of geometry points may include interpolated points (e.g., points interpolated in time and/or space)

In some embodiments of the invention, the plurality of geometry points includes "fuzzy" points. The term "fuzzy" point refers to a point that is not solely binary, but rather includes a confidence level (e.g., a probability) that the point is within the geometry. Fuzzy points may include not only the raw coordinates (e.g., the original cloud of geometry points), but also dilated and/or filled-in voxels as described herein. By including fuzzy points, the present invention may also be practiced to generate a particular level set of the binary geometry in addition to wrapping a surface around the entire binary representation (e.g., a 90% model would generate a surface model using geometry points having a confidence value of at least 0.9, while a 99% model would generate a surface model using geometry points having a confidence value of at least 0.99). For purposes of the explanation herein, however, the plurality of geometry points will be described as binary; one of ordinary skill in the art will appreciate how to extend the invention as described in connection with a binary representation to other representations.

Once the cloud of geometry points is accessed, they are binned into a three-dimensional array of voxels in step 110, as representatively illustrated in FIG. 2b. A "voxel" is a three-dimensional version of a pixel—a portmanteau of "volumetric pixel"—and is a common unit of graphic information in a three-dimensional environment. Binning step 110 may be executed by a binning processor.

In step 120, a binary representation 200 (FIGS. 4, 6, and 9) of the plurality of geometry points is created by associating a first binary value with each voxel in which a geometry point is binned. Preferably, the size of the array of voxels is dynamic in order to accommodate subsequently added geometry points, which may be added via additional data collection utilizing a suitable localization system or via the addition of geometry points during dilation. In some embodiments of the invention, the dynamic array is provided using a custom Array algorithm that is expandable without reallocation of memory. The addition of geometry points in connection with a dilation process will be described in greater detail below. FIG. 2c illustrates the binary representation of the plurality of geometry points shown in FIGS. 2a and 2b. Typically, a binary value of "1" will be associated with each voxel in which a geometry point is binned ("occupied voxels"), and a binary value of "0" will be associated with each voxel in which no geometry point is binned ("unoccupied voxels").

In step 130, an image close algorithm is applied to the binary representation of the plurality of geometry points. The image close algorithm may be executed by an image close processor. The image close algorithm transforms (e.g., eliminates) voids within the binary representation (e.g., voxels having a second binary value associated therewith) to create a segmented volume. "Voids" are defined as one or more adjacent unoccupied voxels that are surrounded by occupied voxels, and are undesirable in the segmented volume from which the surface model will be created. Voids may include, for example, completely surrounded holes in a three-dimensional geometry and partially surrounded holes as in a torus.

Typically, the image close algorithm will include a dilation process and an erosion process, both of which will be described in greater detail below. The segmented volume that results from the image close algorithm includes the plurality of geometry points and the transformed voids.

Once the segmented volume is generated, a surface construction algorithm may be applied to the segmented volume in step 140 to form a surface model 150 of the three-dimensional object. Step 140 may be executed by a surface construction processor. A suitable surface construction algorithm is the marching cubes algorithm, but other surface construction algorithms may be employed with equal success. The marching cubes algorithm and other suitable surface construction algorithms will be known to those of ordinary skill in the art.

As described above, a system for generating a surface model from the plurality of geometry points generally includes a processor programmed to bin the plurality of geometry points into an n-dimensional array of elements, an image close processor programmed to dilate and erode the binned plurality of geometry points, and a surface construction processor programmed to generate a surface on an output of the image close processor. It is contemplated that the various processors may be incorporated into one or more computer systems, and that one or more processors within any such computer system may be used to practice the various aspects of the present invention. Further, one or more processor functions described herein may be integrated in a single processor, or within a single computer system, without departing from the scope of the present invention. In addition, the binning, image close, and surface construction algorithms may be incorporated into one or more software programs that are executed by one or more processors incorporated in or coupled to one or more computer systems. The system may also include a localization system, such as the Ensite NavX™ system, the CARTO system, or another suitable localization system, to generate the plurality of geometry points. The localization system may also be as described in U.S. application Ser. No. 11/647,304, filed 29 Dec. 2006, which is hereby incorporated by reference as though fully set forth herein.

Various aspects of the image close algorithm will now be discussed. As described above, the image close algorithm generally includes two processes: a dilation process and an erosion process. Thus, a dilation structuring element, having a shape and a volume, and an erosion structuring element, also having a shape and a volume, are preferably defined (e.g., step 410, FIG. 4, and step 710, FIG. 7, respectively). The dilation structuring element is used to dilate the binary representation 200 of the plurality of data points to create a dilated binary representation 220 (FIGS. 4 and 7) having a surface perimeter, while the erosion structuring element is used to erode the surface perimeter to create the segmented volume. The dilation structuring element and the erosion structuring element may have identical shapes and volumes. Preferably, the structuring elements are spherical.

Figure 4:
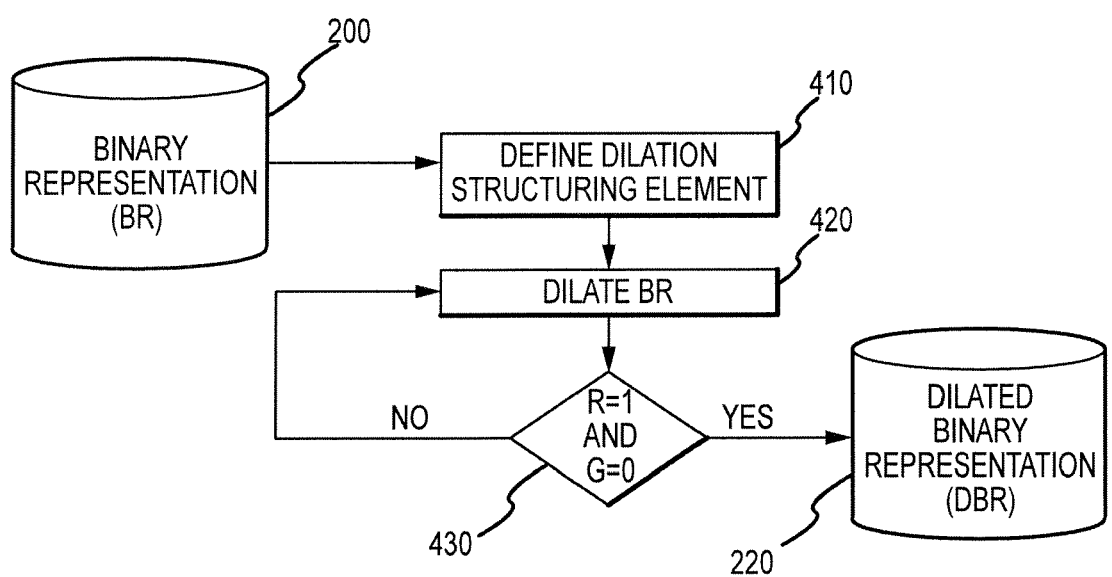
FIG. 4 is a flowchart of an iterative dilation process.

As one of ordinary skill in the art will recognize, a dilation process applies the dilation structuring element to the binary representation of the plurality of geometry points and adds one or more layers to the binary representation by converting voxels within the volume of the dilation structuring element to the first binary value (e.g., a binary value of 1) (e.g., step 420, FIG. 4). Preferably, the structuring element is a spherical structuring element of radius sufficient to capture exactly the next layer of voxels, which facilitates growing the binary representation by the minimum amount required to meet any predefined or preset stopping criteria. This increases the size of the binary representation while retaining its same general shape (e.g., it thickens the binary representation). Typically, to reduce the time and overhead required to perform the dilation operation, only the outermost occupied voxels will have the dilation structuring element applied to them, such that the binary representation is expanded (e.g., is dilated) on a layer-by-layer basis. The voxels that are within the volume of the dilation structuring element, and thus that are converted to the first binary value, are referred to herein as "dilated voxels."

Figure 3A:
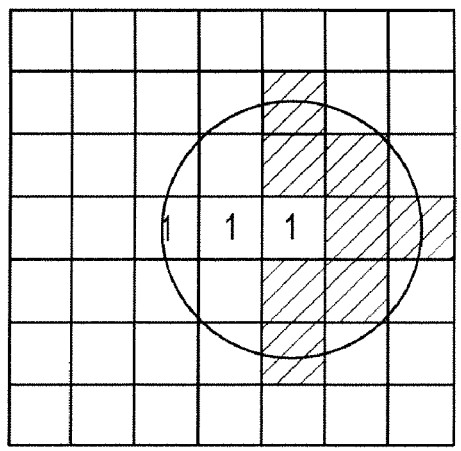
FIG. 3a is two-dimensional exemplary binary representation of a plurality of geometry points.
Figure 3B:
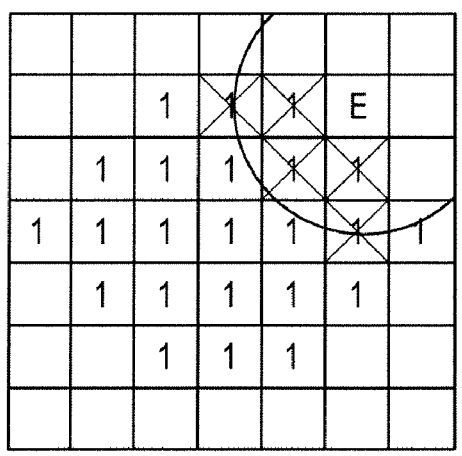

FIGS. 3a and 3b illustrate, in two dimensions for ease of presentation, a dilation operation performed on the binary representation of FIG. 2c at various stages. For purposes of illustration only, and without limiting the present invention, each element shown in FIGS. 3a and 3b is a unit square pixel, and the dilation structuring element is a circle with a radius of 2 units. Further, for ease of illustration only, the same dilation structuring element will be used throughout this description and the accompanying figures. Also for ease of illustration, only binary values of 1 are shown; unoccupied voxels are shown as blank.

FIG. 3a depicts the binary representation of a plurality of data points of FIG. 2c. In this case, there are three occupied voxels (e.g., voxels with a binary value of 1). The circular dilation structuring element is shown drawn about the rightmost occupied voxel, and, for ease of illustration and understanding, those voxels that are within the area of the dilation structuring element (that is, those voxels whose centers fall within the dilation structuring element) are identified with cross-hatching. These cross-hatched voxels are dilated by this dilation structuring element, adding layers to the binary representation of FIG. 3a. Though only one dilation structuring element is actually drawn on FIG. 3a, one of ordinary skill in the art will understand that the same process may be applied to the remaining occupied voxels. In at least some embodiments of the invention, it is contemplated that dilation may occur to a first preset threshold (e.g., a dilation structuring element of fixed size may be utilized to add a preset number of layers to the binary representation of the plurality of data points).

The result of the dilation process is referred to herein as a "dilated binary representation." The dilated binary representation of FIG. 3a is shown in FIG. 3b (with the cross-hatched voxels replaced with binary values of "1" to indicate that they are occupied voxels). It should be understood that the originally collected geometry points (e.g., the occupied voxels in FIG. 3a) may be represented differently than dilated voxels (e.g., voxels occupied by virtue of the dilation process). This may be used to eliminate the possibility that the originally collected geometry points will be eroded during subsequent erosion processes.

Figure 7:
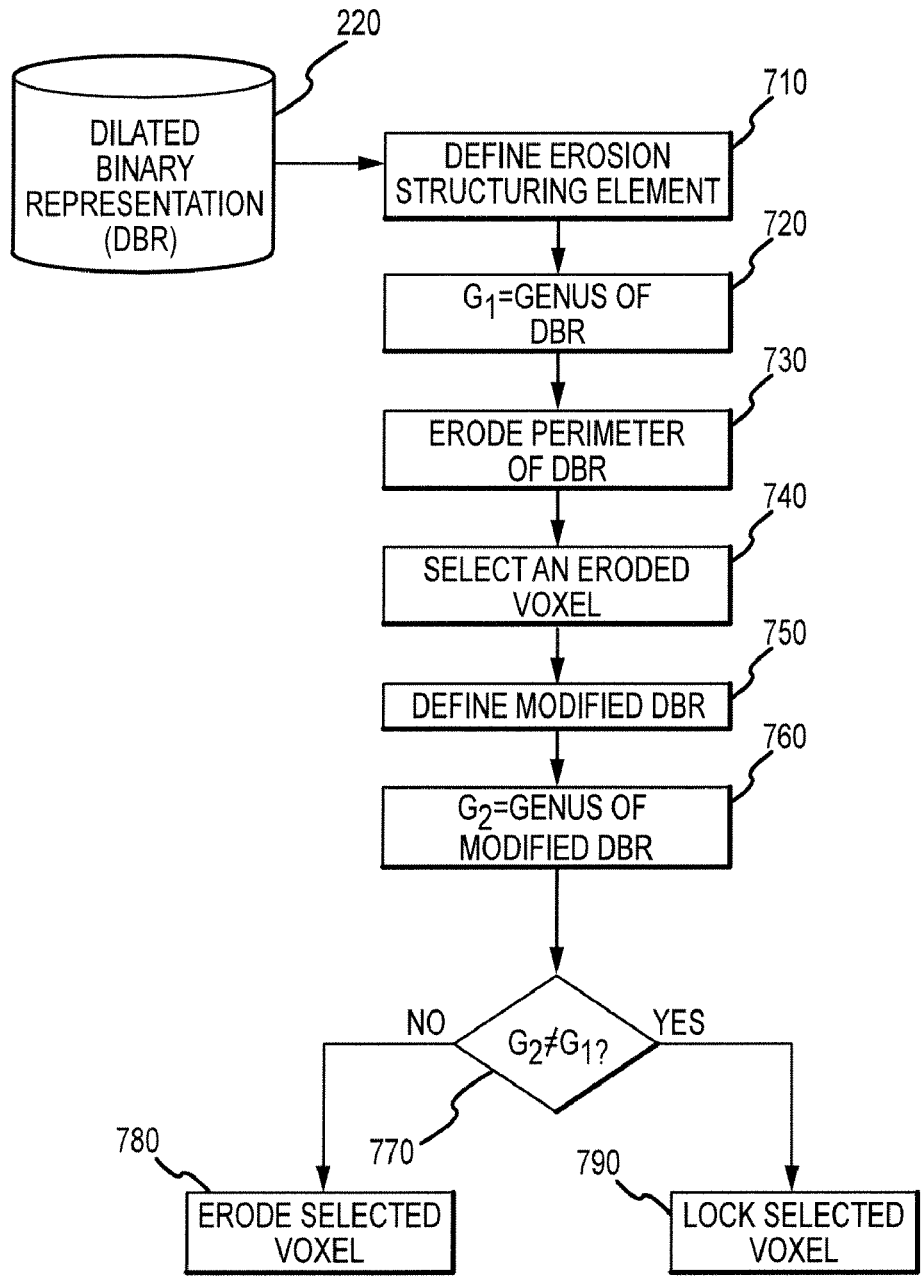
FIG. 7 is a flowchart of an erosion process that prevents the creation of voids.

As one of ordinary skill in the art will recognize, an erosion process applies the erosion structuring element to the perimeter of the dilated binary representation (e.g., the perimeter of voxels occupied after the dilation process) to remove one or more layers from the dilated binary representation by converting voxels within the volume of the erosion structuring element to the second binary value (e.g., a binary value of 0) (e.g., step 730, FIG. 7). This reduces the size of the binary representation on a layer-by-layer basis while retaining its same general shape. The voxels that are within the volume of the erosion structuring element, and thus that are converted to the second binary value, are referred to herein as "eroded voxels."

Figure 3C:
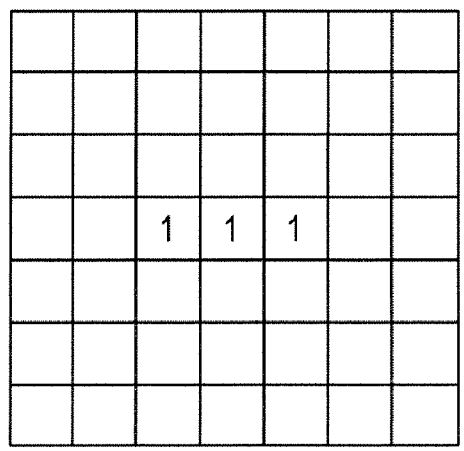
FIG. 3c illustrates the results of an erosion operation on FIG. 3b.

FIGS. 3b and 3c illustrate, in two dimensions for ease of presentation, an erosion operation performed on the dilated binary representation of FIG. 3b. For the sake of illustration, the erosion structuring element is a circle with a radius of 2 units, and thus is identical in shape and size to the dilation structuring element utilized to create the dilated binary representation of FIG. 3b. For the sake of illustration, only a single erosion structuring element, centered at the voxel labeled "E," is shown in FIG. 3b; one of ordinary skill in the art will appreciate that the same process may be repeated at all voxels along the perimeter of the dilated binary representation. For the sake of presentation and understanding, the voxels within the erosion structuring element (that is, those voxels whose centers are within the erosion structuring element) are identified with an "X" therethrough, indicating that the erosion structuring element will erode these voxels, removing layers from the dilated binary representation of FIG. 3b. In at least some embodiments of the invention, it is contemplated that erosion may occur to a second preset threshold (e.g., an erosion structuring element of fixed size, such as a spherical erosion element of radius 2 units, may be used to remove a preset number of layers from the dilated binary representation).

The result of the erosion process is referred to herein as a "segmented volume." The segmented volume resulting from the erosion process on FIG. 3b is shown in FIG. 3c. It should be understood that the number of erosion steps and/or layers will typically be less than or equal to the number of dilation steps and/or layers. This also eliminates the possibility that originally occupied voxels (e.g., those voxels occupied by the collected geometry points) will be eroded.

As one of ordinary skill in the art will recognize, the image close algorithm described above, and in particular the dilation process described above, may leave voids in the segmented volume. If voids remain, the surface resulting from the segmented volume may undesirably include one or more disconnected surfaces inside the surface of interest. In some embodiments of the invention, this shortcoming may be overcome by performing a flood fill operation on the dilated binary representation prior to the erosion process. As one of ordinary skill in the art will recognize, a flood fill identifies unoccupied voxels that are surrounded by occupied voxels and converts the unoccupied voxels to occupied voxels. That is, the flood fill operation transforms voids to occupied voxels, such that the converted voxels become part of the dilated binary representation.

It is also desirable for the segmented volume to be homeomorphic to a sphere such that the surface model generated therefrom is homeomorphic to a sphere. A triangulated surface that is homeomorphic to a sphere satisfies the Euler condition F=2N−4, where F is the number of facets and N is the number of vertices. Similarly, for voxels, the number of faces obeys a relationship to the number of nodes F=N−2, where F is the number of faces and N is the number of nodes.

The genus G of a structure is a measure of the number of holes in the structure. For example, a torus having one hole has a genus of minus one (−1). Generally, a structure having M holes has a genus G of minus-M (−M). For a given structure having F faces and N nodes, the genus is given by the equation $$G = -\left[\frac{F - (N - 2)}{2}\right].$$

If the object consists of R separate, disconnected three-dimensional regions, then an overall genus may be defined to be $$G_O = (R - 1) - \left[\frac{F - (N - 2)}{2}\right].$$

The segmented volume, and the three-dimensional surface model generated therefrom, is homeomorphic to a sphere if it consists of a single three-dimensional region containing no holes (that is, G=0 and R=1). One of ordinary skill in the art will recognize that these conditions may be met by using sufficiently large structuring elements, particularly dilation structuring elements, in the imaging closing algorithm. Sufficiently large structuring elements will merge disconnected three-dimensional regions and subsume any voids such that they may be transformed to occupied voxels.

It may, however, be difficult to determine the necessary size of structuring element required to meet the above conditions prior to the start of the image close algorithm. Accordingly, the present invention provides methods of dynamically determining the size of dilation structuring element necessary to meet these conditions by monitoring R and G during the dilation process. It is contemplated that R and G may be calculated after a single voxel has been dilated (e.g., the conversion of a single voxel within the volume of the dilation structuring element applied to the binary representation), after multiple voxels have been dilated (e.g., the conversion of all voxels within the volume of the dilation structuring element applied to the binary representation), after a complete iteration of the dilation operation (e.g., after dilation structuring elements have been applied to the entire binary representation and the voxels therein converted), or some combination thereof.

In some embodiments of the invention, R may be efficiently calculated by maintaining a "connectivity map." In a connectivity map, each connected region of voxels is assigned a unique index. When a new voxel is added, for example through dilation, it is determined what regions that voxel is in contact with. If the added voxel touches more than one region, then those regions are merged into a single region so that they all share a common index. Determining R is then simply a matter of counting the number of indices currently in use. G may be efficiently computed by monitoring the deltas of the number of faces and nodes. When a voxel is added (e.g., dilated) or removed (e.g., eroded), the change in these values can be determined by evaluating whether a face is removed (e.g., the dilated voxel is adjacent to one or more other voxels), and likewise whether there has been a net change in the number of nodes.

In one embodiment of the invention, the dilation process is iteratively repeated until the R-value of the dilated binary representation equals 1 and the genus of the dilated binary representation equals 0. One of ordinary skill in the art will understand iterative dilation, which, in each iteration, typically applies the dilation structuring element to the outermost occupied voxels resulting from the previous iteration (e.g., the perimeter of the binary representation). For example, the first dilation iteration will apply dilation structuring elements to the outermost voxels occupied by geometry points; the second dilation iteration will apply dilation structuring elements to the outermost occupied voxels resulting from the first iteration; and so forth. Typically, the dilation structuring element utilized in all iterations will be of identical shape and volume, as shown in the flowchart of FIG. 4, though it is contemplated that dilation elements having increasing volumes may be used.

As shown in FIG. 4, the iterative dilation process starts with the binary representation 200 of the plurality of geometry points. In step 410, a dilation structuring element, such as a spherical structuring element, is defined. The dilation structuring element is used to dilate the binary representation in step 420, for example by applying the dilation structuring element to the outermost occupied voxels in the binary representation. In decision block 430, the image close processor determines whether the stopping conditions are met (e.g., that the binary representation is homeomorphic to a sphere with R=1 and G=0). If they are met, the dilated binary representation 220 is output for erosion. If they are not met, the process repeats from dilation step 420, for example by applying the dilation structuring element to the outermost occupied voxels resulting from the just-completed iteration. Optionally, a flood fill operation may be executed between dilation step 420 and decision step 430, such that a flood fill operation occurs in every iteration of the dilation process. In addition, the volume of the dilation structuring element may be incremented before executing the next iteration of dilation step 420.

Figures 5A, 5B, 5C:
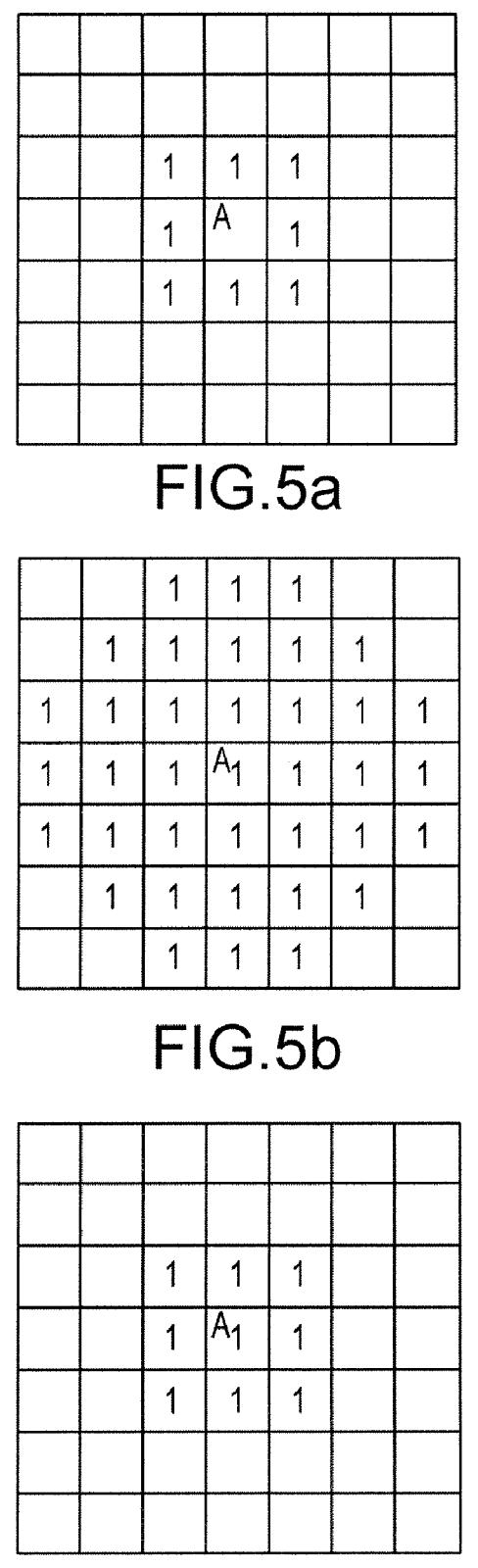

The iterative process may be further refined by keeping track of voxel dilations that increase the genus of the binary representation. If dilating a voxel increases the genus of the binary representation, then a void has been filled. This is representatively shown in FIGS. 5a and 5b. In the binary representation of FIG. 5a, voxel A represents a void; the genus of FIG. 5a is minus-one. In the dilated binary representation of FIG. 5b, voxel A has been dilated (along with a plurality of other voxels within the volumes of the dilation structuring elements applied to the binary representation of the plurality of geometry points); the genus of FIG. 5b is zero.

If a void has been filled, it is desirable to redefine the plurality of geometry points to include the coordinates of the dilated voxel that fills the void. The binary representation of the plurality of geometry points may similarly be redefined to include the voxel that, when dilated, increased the genus of the binary representation. Within the context of FIG. 5b, only the dilation of voxel A increases the genus; the genus of FIG. 5a is unchanged by the dilation of the other voxels. Thus, the coordinates of voxel A are added to the plurality of geometry points, and voxel A becomes a "locked" geometry point. It should be understood that "locked" geometry points may be represented differently than original geometry points, which would permit treating "locked" geometry points differently than original geometry points during processing if so desired.

Figure 6:
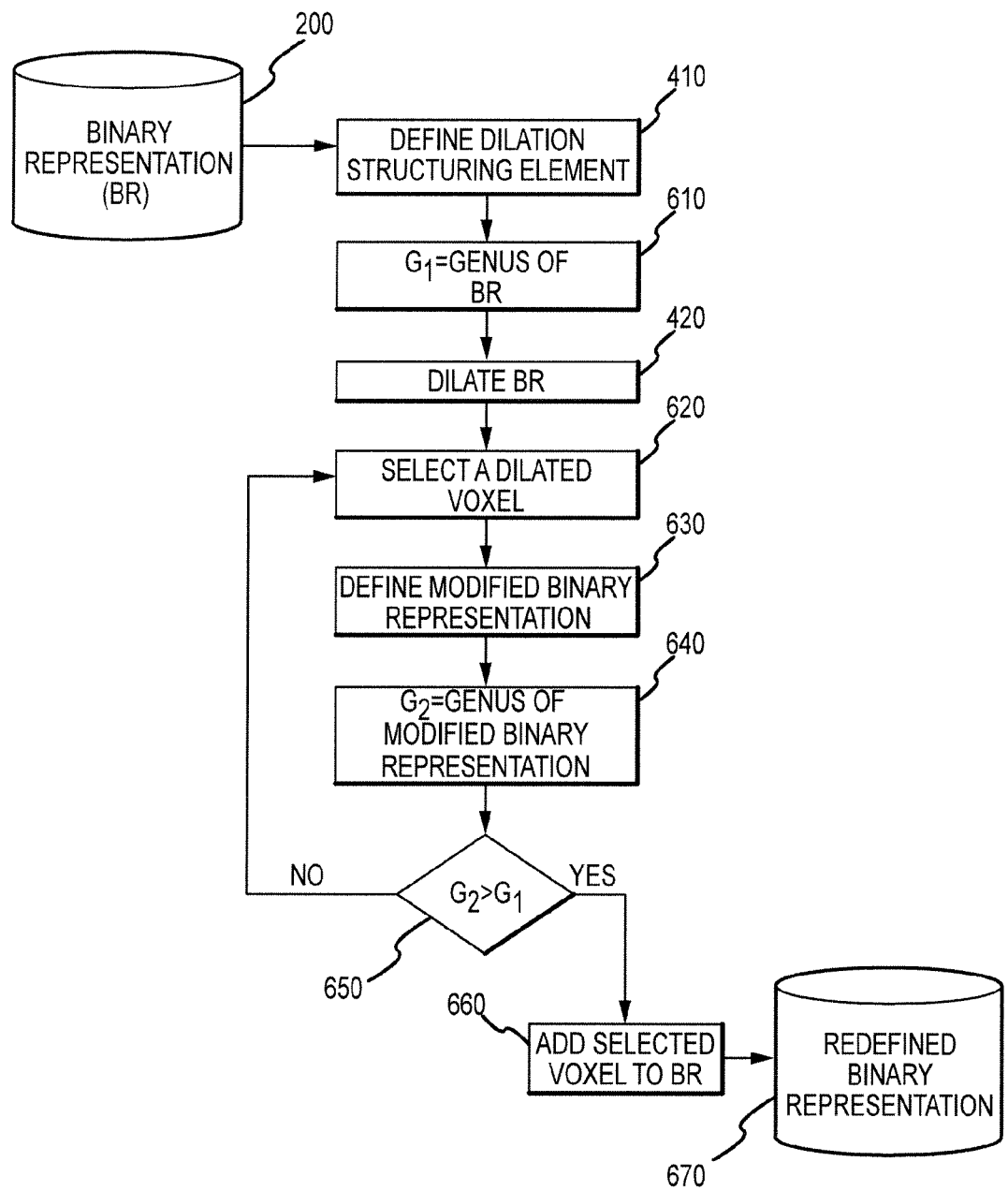
FIG. 6 is a flowchart of a dilation process that supplements the plurality of geometry points.

As should be clear from the foregoing discussion, and as representatively illustrated in FIG. 6, tracking is preferably done on a voxel-by-voxel basis, preferably for each voxel within the plurality of dilated voxels, in order to identify those voxels that, when dilated, increase the genus of the binary representation. For example, one dilated voxel of the plurality of dilated voxels (e.g., voxel A) may be selected in step 620, and a modified binary representation (e.g., FIG. 5c) may be generated in step 630. The modified binary representation includes the plurality of geometry points and the selected dilated voxel (e.g., it preferably varies from the binary representation 200 by addition of a single dilated voxel). In step 640, the genus of the modified binary representation is calculated (in FIG. 5c, G=0) and compared to the genus of the binary representation, which was calculated in step 610, in decision block 650. If the genus of the modified binary representation is greater than the genus of the binary representation, the plurality of geometry points and the binary representation thereof may be redefined as described above in step 660 (e.g., by redefining the modified binary representation as the binary representation) to output a redefined binary representation 670. If the genus did not increase, then the process may be repeated with a newly selected dilated voxel until all dilated voxels have been analyzed for their effect on the genus.

Once the plurality of geometry points and the binary representation thereof have been redefined as described above, one or more additional dilation iterations may be performed on the redefined binary representation. Thus, as described above and shown in FIG. 4, the next dilation iteration is preferably performed utilizing the same dilation structuring element, though it is contemplated that, in some embodiments of the invention, successively larger or smaller dilation structuring elements may be utilized.

Advantageously, the method disclosed herein reduces the amount of dilation necessary in subsequent iterations to reach the stopping conditions of R=1 and G=0. That is, the method disclosed herein reduces the size of the dilation structuring element and/or the number of dilation iterations utilizing a fixed dilation structuring element required to reach the stopping conditions of R=1 and G=0, and thus minimizes surface smoothing.

Just as it is desirable to supplement the plurality of geometry points with voxels that, when dilated, eliminate voids, so too is it desirable to prevent the erosion of voxels that, when eroded, create voids. This can be implemented by tracking the genus of the dilated binary representation during the erosion process as well as during the dilation process. If eroding a voxel within the volume of the erosion structuring element decreases the genus of the dilated binary representation, then a void has been created. Since the creation of voids is undesirable, a voxel should only be eroded if doing so does not decrease the genus; if erosion of a voxel decreases the genus, that voxel should be "locked." In some embodiments, the plurality of geometry points may also be redefined to include the coordinates of the voxel.

Likewise, it is undesirable to erode voxels that cause the segmented volume to be broken into more than one region (e.g., that increase the value of R). Accordingly, it is desirable to continuously monitor R to prevent increases therein. This can also be determined by observing if G increases during erosion.

As should be clear from the foregoing discussion, and as representatively illustrated in FIG. 7, tracking is preferably done on a voxel-by-voxel basis, preferably for each voxel within the plurality of eroded voxels, in order to identify those voxels that, when eroded, change the genus of the dilated binary representation. For example, one eroded voxel of the plurality of eroded voxels may be selected in step 740, and a modified dilated binary representation may be generated in step 750. The modified dilated binary representation excludes the selected eroded voxel; that is, it preferably differs from the dilated binary representation by the removal of a single eroded voxel. The genus of the modified dilated binary representation may be calculated in step 760 and compared in decision block 770 to the genus of the dilated binary representation, which was calculated in step 720. If the genus of the modified dilated binary representation does not differ from the genus of the dilated binary representation, the voxel may safely be eroded in step 780. If, however, the genus of the modified dilated binary representation differs from the genus of the dilated binary representation, the voxel should be locked (step 790), and may optionally also be used to redefine the plurality of geometry points. The process illustrated and described is preferably repeated for each of the plurality of eroded voxels.

One or more additional iterations of the erosion process may also be performed. Typically, each iteration of the erosion process will start with R=1 and G=0 because, preferably, the dilation process does not stop, and thus the erosion process does not commence, until these conditions are satisfied. In addition, as described above, voxels should not be eroded if they reduce or increase the genus. Preferably, the number of erosion iterations will be the same as the number of dilation iterations, such that the segmented volume is approximately the same size and shape as the original binary representation. In order to advantageously thicken the segmented volume, however, erosion may be reduced or eliminated in certain areas, such as the vicinity of voxels locked during the erosion process. That is, fewer erosion iterations, or no erosion iterations at all, may be performed in these areas of the dilated binary representation.

It is also contemplated that additional erosion iterations may be carried our where it is believed that the original geometry points overestimate the size of the segmented volume. This could be the case, for example, where the mapping catheter employed to gather the geometry points has the tendency to distend the tissue slightly. Cardiac motion also tends to increase the overall size of the chamber.

It may also be desirable to define "surface geometry points" within the cloud of geometry points. "Surface geometry points" are those points positively identified on the surface of the heart tissue, rather than interior to the heart chamber. Where surface geometry points are defined, it is contemplated that additional erosion iterations will be carried out until those surface points coincide with the boundary of the segmented volume.

Figure 8A:
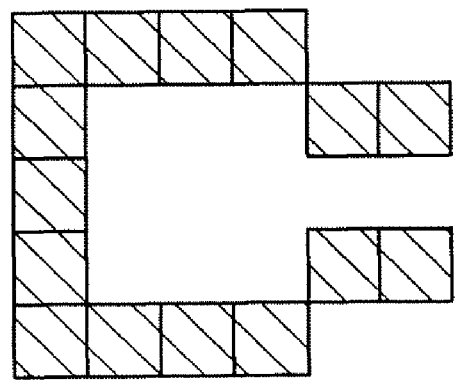
FIG. 8a illustrates a binary representation of an open loop.
Figure 8B:
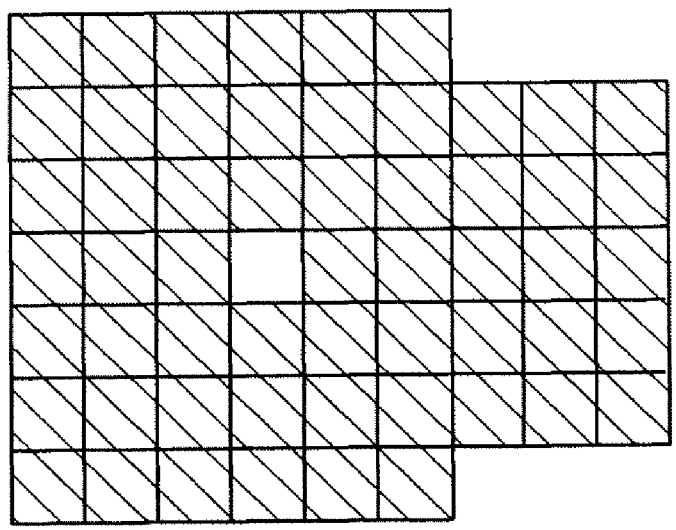

During the dilation process, it is possible for the genus of the binary representation to decrease before converging on G=0. This may occur, for example, when a new hole is created by dilating voxels that close a loop, such as is illustrated in FIGS. 8*a* and 8*b* (occupied voxels are shown as crosshatched). With respect to creating surface models of cardiac chambers, this effect can result in the merging of structures that are in close proximity to each other, such as the left atrial appendage and the left superior pulmonary vein. It is desirable to prevent such merger.

Figure 9:
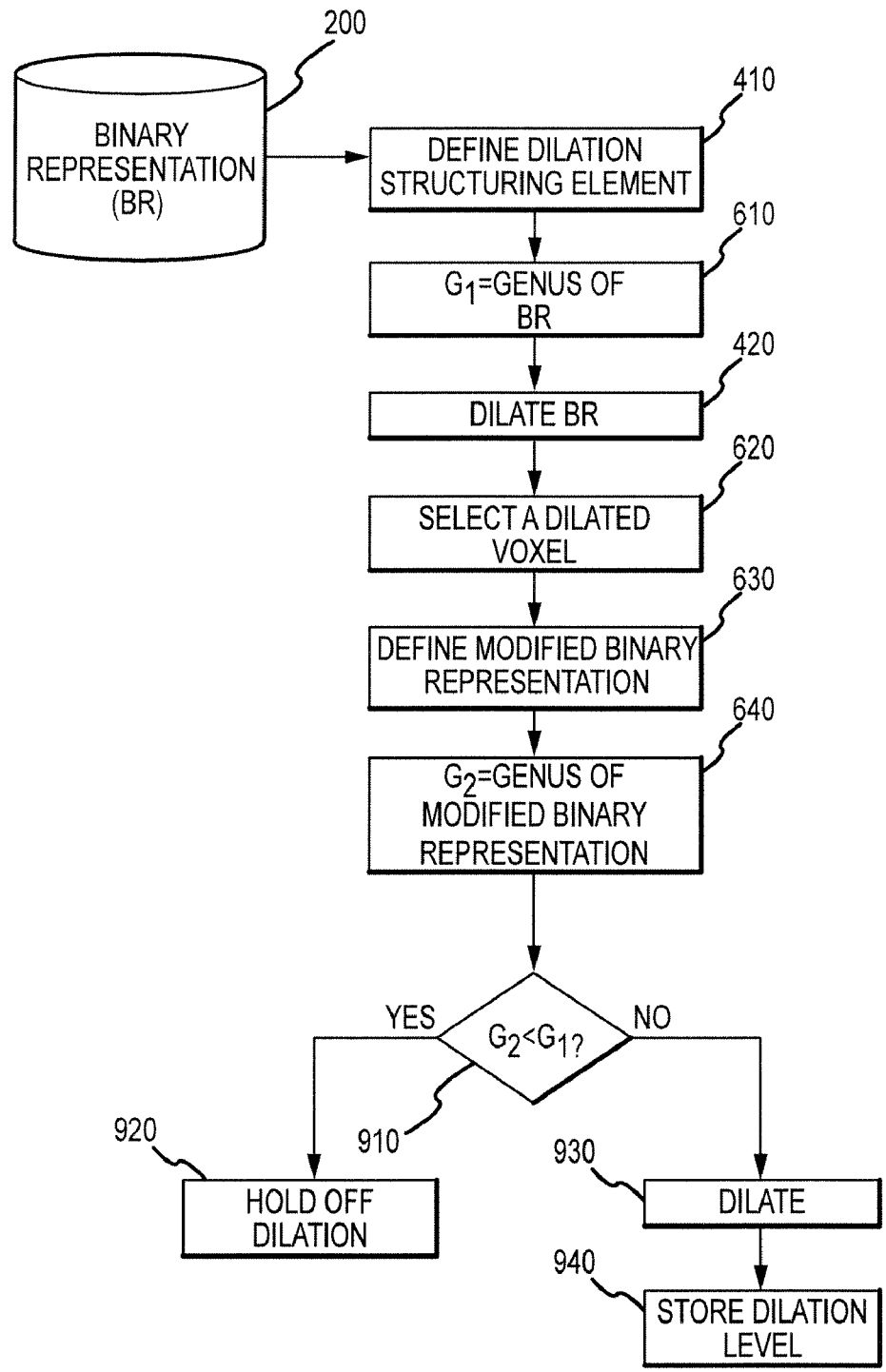
FIG. 9 is a flowchart of an image close process that prevents the merger of nearby structures.

Accordingly, as illustrated in the flowchart of FIG. 9, the dilation of a voxel may be prevented ("held off") if dilating the voxel will decrease the genus of the binary representation (e.g., will create a void). Dilation is held off on a voxel-by-voxel basis for each iteration of the dilation process. Thus, if during the $n^{th}$ iteration of the dilation process, dilation of a particular voxel will reduce the genus of the binary representation, as determined in step 910, the voxel is not dilated (step 920). If dilating the voxel does not decrease the genus, then the voxel may be dilated (step 930). If, on a subsequent iteration of the dilation process, such as the $(n+1)^{st}$ iteration of the dilation process, the previously held-off voxel may be dilated without decreasing the genus, then the voxel may be dilated.

A dilation level, which is preferably related to the iteration on which the voxel was dilated without decreasing the genus, may be associated or stored with the dilated voxel in step 940. To account for dilation hold-off during the erosion process, and thus to prevent erosion of voxels containing geometry points, a voxel is preferably eroded at an erosion level no greater than the dilation level associated with the voxel. For example, if a voxel was safely dilated on the $n^{th}$ iteration of the dilation process, it may be assigned a dilation level of "n," and a voxel with a dilation level of "n" should not be eroded after the $n^{th}$ iteration of the erosion process (e.g., an erosion level that is less than or equal to "n").

An alternative method of addressing dilation hold-off during erosion is also contemplated for use in certain preferred embodiments of the invention. In this alternative method, erosion does not commence until the $n^{th}$ layer is reached during iterations of the erosion process. That is, suppose a total of N layers of dilation. Suppose further that dilation of a particular voxel was held off at the $n^{th}$ layer. Erosion of that voxel should not begin until N−n layers have been eroded first.

Although several embodiments of this invention have been described above with a certain degree of particularity, those skilled in the art could make numerous alterations to the disclosed embodiments without departing from the spirit or scope of this invention. For example, the various embodiments of the dilation and erosion processes described herein may be used in any combination to practice the invention.

It is also contemplated that the dilation and erosion structuring elements may be encoded as a template of voxels overlaid onto the binary representation during the image close process. One of ordinary skill in the art will recognize that use of a template advantageously reduces computing overhead required during the image close process.

In still other embodiments of the invention, it is contemplated that the size of the structuring elements may be related to the distance from the centroid of the cloud of geometry points. For example, smaller structuring elements may be used at greater distances from the centroid of the cloud of geometry points.

Further, it is contemplated that "fuzzy" structuring elements may be used in conjunction with "fuzzy" geometry point clouds. One of ordinary skill in the art will appreciate how to extend the principles described herein to both "fuzzy" geometry point clouds and "fuzzy" structuring elements, for example structuring elements whose values are not solely binary, but rather represent a probability (e.g., a value between 0 and 1) that a particular element should be dilated and/or eroded.

In addition, though the invention has been described in terms of creating a segmented volume that is homeomorphic to a sphere (e.g., R=1 and G=0), the invention may be practiced with any stopping conditions. For example, the invention may be practiced to create multiple segmented volumes, each of which contains no voids. In this case, it is not necessary to reach R=1, but it is desirable for G=0 in each region. Similarly, it may be acceptable to have a certain number of holes, in which case an appropriate non-zero G value may be selected. Other stopping conditions include, but are not limited to, preset dilation thresholds, preset levels of detail, and preset smoothness of the binary representation.

Further, though the invention has been described in terms of a three-dimensional array of voxels, one of ordinary skill in the art will recognize that the invention may be practiced in n-dimensions to generate an n-dimensional model, for example by binning the plurality of geometry points into an n-dimensional array of elements and defining dilation and erosion structuring elements occupying n-dimensional spaces. Likewise, the array of voxels may be uniform or non-uniform. That is, the voxels may be of the same size or of different sizes, and may also be of any shape (e.g., square or rectangular).

All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A method of modeling a surface from a plurality of geometry points representing a three-dimensional object, the method comprising:
    creating a binary representation of the plurality of geometry points by binning the plurality of geometry points into a three-dimensional array of voxels and associating a first binary value with each voxel in which a geometry point is binned;
    transforming voids within the binary representation of the plurality of geometry points using an image close algorithm to create a segmented volume comprising the plurality of geometry points and the transformed voids; and
    applying a surface construction algorithm to the segmented volume to form a surface model of the three-dimensional object.

2. The method according to claim 1, further comprising generating the plurality of geometry points utilizing a localization system.

3. The method according to claim 2, wherein the three-dimensional object is a portion of a heart, and wherein the step of generating the plurality of geometry points utilizing a localization system comprises:
    inserting a mapping catheter into the portion of the heart;
    moving the mapping catheter within the portion of the heart; and
    periodically utilizing the localization system to measure a location of the mapping catheter within the portion of the heart.

4. The method according to claim 1, wherein the surface construction algorithm comprises a marching cubes algorithm.

5. The method according to claim 1, wherein the image close algorithm comprises the steps of:
    defining a dilation structuring element having a shape and a volume;
    dilating the binary representation of the plurality of geometry points with the dilation structuring element to create a dilated binary representation having a surface perimeter;
    defining an erosion structuring element having a shape and a volume; and
    eroding the surface perimeter of the dilated binary representation with the erosion structuring element to create the segmented volume.

6. The method according to claim 5, wherein the shape and the volume of the dilation structuring element are identical to the shape and the volume of the erosion structuring element.

7. The method according to claim 5, wherein the shape of the dilation element and the shape of the erosion element are spherical.

8. The method according to claim 5, further comprising executing a flood-fill operation on the dilated binary representation of the plurality of geometry points prior to the eroding step.

9. The method according to claim 5, further comprising iteratively repeating the dilating step until an R-value of the dilated binary representation of the plurality of geometry points equals 1 and a genus of the dilated binary representation of the plurality of geometry points equals 0.

10. The method according to claim 9, wherein the step of iteratively repeating the dilating step comprises iteratively repeating the dilating step utilizing dilation structuring elements having increasingly larger volumes.

11. The method according to claim 5, wherein the dilating step comprises:
    a) calculating a genus of the binary representation of the plurality of geometry points;
    b) dilating the binary representation of the plurality of geometry points with the dilation structuring element to identify a plurality of dilated voxels;
    c) selecting one of the plurality of dilated voxels;
    d) generating a modified binary representation comprising the plurality of geometry points and the selected dilated voxel;
    e) calculating a genus of the modified binary representation; and
    f) assessing whether the genus of the modified binary representation is greater than the genus of the binary representation of the plurality of geometry points, and, if the genus of the modified binary representation is greater than the genus of the binary representation of the plurality of geometry points, redefining the plurality of geometry points and the binary representation of the plurality of geometry points to include the selected dilated voxel.

12. The method according to claim 11, further comprising dilating the redefined plurality of geometry points with the dilation structuring element.

13. The method according to claim 11, further comprising dilating the redefined plurality of geometry points with a redefined dilation structuring element, the redefined dilation structuring element having the shape of the dilation structuring element and a volume that is greater than the volume of the dilation structuring element.

14. The method according to claim 11, further comprising repeating steps a) through f) for each voxel within the plurality of dilated voxels.

15. The method according to claim 5, wherein the eroding step comprises:
    a) calculating a genus of the dilated binary representation;
    b) eroding the surface perimeter of the dilated binary representation with the erosion structuring element to identify a plurality of eroded voxels;
    c) selecting one of the plurality of eroded voxels;
    d) generating a modified dilated binary representation excluding the selected eroded voxel;
    e) calculating a genus of the modified dilated binary representation; and f) assessing whether the genus of the modified dilated binary representation differs from the genus of the dilated binary representation, and, if the genus of the modified dilated binary representation does not differ from the genus of the dilated binary representation, redefining the dilated binary representation to exclude the selected eroded voxel.

16. The method according to claim 5, wherein the dilating step is not permitted to modify the binary representation by dilating one or more voxels where the dilation of the one or more voxels would decrease a genus of the dilated binary representation.

17. The method according to claim 16, further comprising associating a dilation level with a dilated voxel, the dilation level being related to a dilation iteration during which the dilated voxel was dilated without decreasing a genus of the binary representation of the plurality of geometry points.

18. The method according to claim 17, wherein the dilated voxel is eroded at an erosion level no greater than the dilation level associated with the dilated voxel.

19. The method according to claim 5, wherein the eroding step is not permitted to modify the dilated binary representation by eroding one or more voxels where the erosion of the one or more voxels would increase an R-value of the segmented volume.

20. The method according to claim 5, wherein the eroding step is not permitted to modify the dilated binary representation by eroding one or more voxels where the erosion of the one or more voxels would change a genus of the segmented volume.

21. The method according to claim 5, further comprising:
defining a plurality of surface geometry points within the plurality of geometry points; and
iteratively repeating the eroding step until a boundary of the segmented volume coincides with the plurality of defined surface geometry points.

22. A method of modeling a surface from a plurality of geometry points, the method comprising:
binning the plurality of geometry points into a n-dimensional array of elements;
dilating the binned plurality of geometry points utilizing a dilation algorithm to eliminate at least one void within the binned plurality of geometry points;
eroding an output of the dilation algorithm utilizing an erosion algorithm to output a voidless segmented volume defined by the plurality of geometry points; and
applying a surface construction algorithm to the voidless segmented volume to output an n-dimensional surface model representing a boundary defined by the plurality of geometry points.

23. The method according to claim 22, wherein the dilation algorithm comprises:
defining a dilation structuring element occupying an n-dimensional space;
calculating a genus of the binned plurality of geometry points;
applying the dilation structuring element to a geometry point within the binned plurality of geometry points;
modifying the binned plurality of geometry points to include an element within the n-dimensional space occupied by the dilation structuring element;
calculating a genus of the modified binned plurality of geometry points;
comparing the genus of the binned plurality of geometry points to the genus of the modified binned plurality of geometry points; and
redefining the binned plurality of geometry points to include the element within the n-dimensional space occupied by the dilation structuring element if the genus of the modified binned plurality of geometry points is greater than the genus of the binned plurality of geometry points.

24. The method according to claim 22, wherein the erosion algorithm comprises:
defining an erosion structuring element occupying an n-dimensional space;
calculating a genus of the dilated binned plurality of geometry points;
applying the erosion structuring element to an element on a perimeter of the dilated binned plurality of geometry points;
modifying the dilated binned plurality of geometry points to exclude an element within the n-dimensional space occupied by the erosion structuring element;
calculating a genus of the modified dilated binned plurality of geometry points;
comparing the genus of the dilated binned plurality of geometry points to the genus of the modified dilated binned plurality of geometry points; and
redefining the dilated binned plurality of geometry points to exclude the element within the n-dimensional space occupied by the erosion structuring element if the genus of the modified dilated binned plurality of geometry points is not less than the genus of the dilated binned plurality of geometry points.

25. The method according to claim 22, wherein the surface construction algorithm comprises a marching cubes algorithm.

26. The method according to claim 22, wherein n equals 3.

27. The method according to claim 22, wherein the output of the dilation algorithm has an R-value of 1 and a genus of 0.

28. A method of constructing a surface from a cloud of geometry points, the method comprising:
creating a representation of the cloud of geometry points by binning the cloud of geometry points into an array of voxels and associating a confidence value with each voxel in the array, wherein the confidence value expresses a probability that a geometry point is binned within a respective voxel;
eliminating voids within the cloud of geometry points, thereby creating a voidless segmented volume defined by the cloud of geometry points; and
constructing a surface bounding the voidless segmented volume defined by the cloud of geometry points.

29. The method according to claim 28, wherein the step of eliminating voids within the cloud of geometry points comprises:
dilating the cloud of geometry points to eliminate voids therein; and
eroding a perimeter of the dilated cloud of geometry points to create the segmented voidless volume defined by the cloud of geometry points.

30. The method according to claim 29, wherein the step of dilating the cloud of geometry points comprises dilating the cloud of geometry points to a first preset threshold, and wherein the step of eroding a perimeter of the dilated cloud of geometry points comprises eroding the perimeter of the dilated cloud of geometry points to a second present threshold.

31. The method according to claim 28, wherein the step of constructing a surface bounding the voidless segmented volume comprises tiling a surface on the voidless segmented volume using a marching cubes algorithm.

32. A system for generating an n-dimensional surface model from a plurality of geometry points, said system comprising:
- a localization system to generate the plurality of geometry points;
- a processor programmed to bin the plurality of geometry points into an n-dimensional array of elements;
- an image close processor programmed to dilate and erode the binned plurality of geometry points; and
- a surface construction processor programmed to generate a surface on an output of said image close processor.

33. The system according to claim 32, wherein said output of said image close processor comprises a single segmented volume free of voids therein.

34. The system according to claim 32, wherein said image close processor redefines the plurality of geometry points to include at least one element within the n-dimensional array of elements, the dilation of which increases a genus of the plurality of geometry points.

35. The system according to claim 32, wherein said image close processor redefines the plurality of geometry points to include at least one element within the n-dimensional array of elements, the erosion of which decreases a genus of the plurality of geometry points.

36. A method of modeling a surface from a plurality of geometry points representing an object, the method comprising:
- creating a representation of the plurality of geometry points by binning the plurality of geometry points into an n-dimensional array of cells and associating a confidence value with each cell, wherein the confidence value for a cell expresses a probability that a geometry point is binned within the cell;
- applying a dilation algorithm to the binned plurality of geometry points to output a dilated binary representation of the plurality of geometry points;
- applying an erosion algorithm to the dilated binary representation of the plurality of geometry points to output a segmented volume; and
- applying a surface construction algorithm to the segmented volume to form a surface model of the object.

37. The method according to claim 36, wherein the step of applying a surface construction algorithm to the segmented volume comprises:
- selecting a confidence level threshold; and
- applying the surface construction algorithm to cells having an associated confidence value greater than or equal to the selected confidence level threshold.

\* \* \* \* \*